United States Patent [19]
Cole

[11] Patent Number: 5,540,547
[45] Date of Patent: Jul. 30, 1996

[54] METHOD AND APPARATUS FOR DAMPING VIBRATIONS OF EXTERNAL TUBING OF A GAS TURBINE ENGINE

[75] Inventor: Lester E. Cole, Morrow, Ohio

[73] Assignee: General Electric Company, Cincinnati, Ohio

[21] Appl. No.: 264,278

[22] Filed: Jun. 23, 1994

[51] Int. Cl.$^6$ .............................. F01D 25/12; F01D 25/28
[52] U.S. Cl. .................... 415/177; 415/115; 415/119; 24/339
[58] Field of Search ..................... 415/115, 119, 415/175, 176, 177, 178; 24/339; 248/68.1, 74.2

[56] References Cited

U.S. PATENT DOCUMENTS

| | | | |
|---|---|---|---|
| 2,426,479 | 8/1947 | Wohlhieter | 24/81 |
| 2,868,486 | 1/1959 | Poupitch | 248/68 |
| 3,029,064 | 4/1962 | Buckingham | 415/178 |
| 3,194,524 | 7/1965 | Trumbull | 248/74 |
| 3,441,986 | 5/1969 | Pritchard | 24/73 |
| 3,486,531 | 12/1969 | Nalodka | 138/103 |
| 3,521,842 | 7/1970 | Opperthauser | 248/54 |
| 3,565,374 | 2/1971 | Jones | 248/54 |
| 3,584,348 | 6/1971 | Soltysik | 24/81 CC |
| 4,019,320 | 4/1977 | Redlinger, Jr. et al. | 415/177 |
| 4,412,782 | 11/1983 | Monsarrat | 415/175 |
| 4,439,876 | 4/1984 | Chalberg | 4/542 |
| 4,490,888 | 1/1985 | LeVant | 24/20 R |
| 4,762,462 | 8/1988 | Lardellier | 415/177 |
| 4,826,114 | 5/1989 | Umehara | 24/339 |
| 4,826,397 | 5/1989 | Shook et al. | 415/175 |
| 4,859,142 | 8/1989 | Burke et al. | 415/178 |
| 5,100,291 | 3/1992 | Glover | 415/177 |
| 5,167,487 | 12/1992 | Rock | 415/177 |
| 5,271,588 | 12/1993 | Doyle | 248/68.1 |
| 5,281,085 | 1/1994 | Lenahan et al. | 415/178 |
| 5,399,066 | 3/1995 | Ritchie et al. | 415/176 |

*Primary Examiner*—Edward K. Look
*Assistant Examiner*—Michael S. Lee
*Attorney, Agent, or Firm*—Andrew C. Hess; Patrick R. Scanlon

[57] ABSTRACT

A method and an apparatus for damping the vibrations of circumferentially extending and generally cantilevered tubing segments of a cooling manifold of a gas turbine engine which is disposed in a generally concentric relationship with and attached to an annular engine casing. The vibration damping means comprises a plurality of clip elements, with each clip element being attached to a pair of axially adjacent ones of the tubing segments at a location proximate free ends of the tubing segments which engage an axially extending manifold plenum in slip joint connections. Each clip element comprises first and second arcuate retainers connected by an arcuate spacer section which establishes the proper axial spacing between the retainers. At least one of the retainers engages the corresponding tubing segments in an interference fit, with each retainer establishing an interference fit in a preferred embodiment. The clip elements increase the natural frequency of the corresponding tubing segments above the principle engine excitation range by increasing the vibrational spring constant of the tubing segments. The clip elements comprise a unitary construction and can be installed by hand in a preferred embodiment or with the assistance of a hand-held tool in an alternate embodiment, thereby providing an economical means of construction and of installation.

11 Claims, 7 Drawing Sheets

METHOD AND APPARATUS FOR DAMPING VIBRATIONS OF EXTERNAL TUBING OF A GAS TURBINE ENGINE

BACKGROUND OF THE INVENTION

1. Field of the Invention

The present invention relates to gas turbine engines associated with aircraft propulsion and, more particularly, to a method and apparatus for damping the vibrations of external tubing segments of gas turbine engines.

2. Related Art

Conventional high bypass ratio turbofan engines typically include a fan, booster, high pressure compressor, combustor, high pressure turbine and low pressure turbine in serial, axial flow relationship. A portion of the air entering the engine passes through the fan, booster and high pressure compressor, being pressurized in succession by each component. This air, which compresses the primary or core air flow, then enters the combustor where the pressurized air is mixed with fuel and burned to provide a high energy gas stream. This primary or core gas stream then expands through the high pressure turbine where energy is extracted to operate the high pressure compressor which is drivingly connected to the high pressure turbine. The primary gas stream then enters the low pressure turbine where it is further expanded, with energy extracted to operate the fan and booster which are drivingly connected to the low pressure turbine. The remainder of the air which enters the engine, other than the core air flow, passes through the fan and exits the engine through a system comprising annular ducts and a discharge nozzle, thereby creating a large portion of the engine thrust.

The highest temperatures in the engine are found in the combustor and turbines. For instance, in a low pressure turbine, which includes a rotor having a plurality of circumferentially spaced rotor blades extending from a rotor disc, and a stator assembly having a stator casing which surrounds the rotor blades, the temperature of the external surface of the stator casing, may be in excess of 1000° Fahrenheit during a typical takeoff condition unless cooling air is applied. The stator assembly also includes multiple stages of nozzle segments and shroud segments which are supported by internal, machined flanges of the stator casing. The nozzles include outer platforms having an interior surface which forms a portion of the outer boundary of the annular flowpath for the primary or core air flow, with the remainder of the outer boundary formed by the equivalent surface of the rotor blade outer platforms, or tip shrouds. The stator shrouds include an inner abradable surface which is disposed adjacent to and radially outward of the corresponding rotor blade tips, thereby defining a radial clearance therebetween. The rotor/stator radial clearance in the low pressure turbine, as well as that for other parts of the engine, varies during transient operation of the engine and also as a function of the various steady state operating conditions of the engine. Large rotor/stator clearances are undesirable because any air passing over the blade tips is unavailable for energy extraction and therefore the efficiency of the engine is reduced. In order to maintain stator casing integrity, by avoiding excessive temperatures, and in order to optimize rotor/stator radial operating clearances, particularly at steady state cruise conditions, large bypass ratio turbofan engines typically include a low pressure turbine cooling manifold which surrounds and is mounted to the stator casing, and which impinges cooling air at selected locations on the casing exterior surface.

The low pressure turbine cooling manifold typically receives fan discharge air from the fan bypass duct via a relatively large circumferentially extending tube on the manifold. The cooling air is then distributed throughout the manifold by a plurality of axially extending plenums and circumferentially extending and axially spaced tubing segments. The manifold is designed so that the air impinges on the external surface of the casing at locations corresponding to the internal flanges used to mount the shroud and nozzle segments, thereby permitting control of the stator flowpath surface and the radial rotor/stator operating clearances.

The temperature of the cooling air is much less than the external temperature of the casing. For instance, during a typical takeoff condition the temperature of this air is typically in the range of 100°–200° Fahrenheit. Due to the difference in the temperature of the casing exterior and that of the cooling air passing through the manifold, it is advantageous to construct the manifold so that a portion of the interfaces between the axially extending distributor plenums and the circumferentially extending tubes comprise slip joints, allowing thermal expansion and contraction of the tubes, while the remainder of the interfaces typically comprise brazed joints. The cooling manifold is mounted to the stator casing via brackets which transmit the mechanical vibrations of the casing to the manifold. The frequency of these vibrations can be multiples of the speeds of the low and high pressure rotor components. This vibration has been known to cause a wear problem to exist at the aforementioned manifold slip joints with visible wear occurring around the periphery of the male end fittings, on the circumferentially extending tubing segments, and around the inner surfaces of the female sleeves integral with the axially extending distributor plenums. This wear problem is independent of axial or circumferential location on the manifold. If not detected or if left uncorrected, the circumferentially extending cooling tubes become loose in the slip joint, allowing leakage of cooling air which has an adverse impact on the radial rotor/stator operating clearances and on casing structural integrity. It is conceivable that extreme conditions of wear could lead to tube breakage.

Once the wear problem has been detected, the conventional method of correcting the problem is to remove the low pressure turbine cooling manifold from the engine and return it to the appropriate engine overhaul facilities for repair or modification. This removal increases operational costs due to the manhours required to remove and replace the manifolds, which must often be accomplished while the engine is installed on the corresponding aircraft, thereby adding to the complexity of the task, and also due to the manhours and materials required to repair or replace the manifolds. Manifold removals also create the need for an inventory of rotable spare component parts to avoid loss of flight time while the manifolds are repaired, and these spare parts further increase operational costs.

Conventional means for damping and/or supporting tubes or pipes in general, as well as those for damping gas turbine engine tubes in particular, typically include one or more of the following disadvantageous characteristics: expensive manufacture; difficult and expensive assembly; inability to install with tubing installed to an engine and/or inability to install with the engine installed on an aircraft, for the applicable gas turbine engines; restrain tubing to be damped from thermal expansion and contraction due to fixed attachment to support structures or due to other restraining features. Accordingly, prior to this invention, a need existed to provide a cost effective and retrofittable method and apparatus for damping vibrations of low pressure turbine cooling manifold tubing segments, thereby improving the installed life span of low pressure turbine cooling manifolds, without requiring a redesign of the manifold or manifold mount system, and wherein the damping means could be installed without removing the manifold from the engine, thereby reducing operational costs due to the avoidance of costs associated with manifold removal and replacement with the engine installed on a corresponding aircraft.

SUMMARY OF THE INVENTION

The present invention is directed to a method and apparatus for damping the vibrations of external tubing mounted on gas turbine engines which may be used for aircraft propulsion. More specifically, in a preferred embodiment, the present invention provides a method of damping the vibrations of circumferentially extending and generally cantilevered tubing segments of a gas turbine engine cooling manifold, wherein the manifold is disposed in a generally concentric relationship with and attached to an annular engine casing. The manifold comprises a plurality of subassemblies which are interconnected to one another and which each include an axially extending plenum having a plurality of female sleeves integral with a first side of the plenum and a plurality of circumferentially extending and generally cantilevered tubing segments which are spaced apart axially. Each of the tubing segments have a first end fixedly attached to a second side of the plenum and a second end terminating in a male connector, with each of the male connectors of the tubing segments of a first one of the sub-assemblies engaging an aligned one of the female sleeves of an adjacent one of the manifold subassemblies in a slip joint connection. In a preferred embodiment, the method of the present invention comprises the steps of: maintaining the manifold in a generally concentric relationship with the casing; attaching a clip element to an adjacent pair of the tubing segments; and positioning the clip element on the pair of tubing segments proximate a corresponding pair of the slip joints.

The present invention also provides an improvement to the cooling manifold which, in a preferred embodiment, comprises a means for damping vibrations of the tubing segments thereby reducing vibration induced wear between corresponding ones of the female sleeves and the male connectors. The damping means comprises a clip element attached to a pair of the tubing segments of a first one of the subassemblies of the manifold and positioned circumferentially adjacent to a corresponding pair of the slip joints. The clip element comprises an arcuate first retainer which retains a first one of the pair of tubing segments, an arcuate second retainer which retains a second one of the pair of tubing segments, and an arcuate spacer section having a concave surface and a convex surface, wherein the spacer section is positioned between the first and second retainers thereby maintaining a proper spatial relationship between the first and second retainers. The clip element increases a spring constant of each of the first and second ones of the pair of tubing segments and accommodates thermal expansion of the pair of tubing segments.

In accordance with another preferred embodiment of the present invention the method step of positioning comprises the step of disposing a convex surface of the clip element toward the annular casing and the step of attaching comprises the step of snapping first and second retainers of the clip element onto the pair of tubing segments. The method further comprises the steps of repeating the foregoing steps with respect to remaining pairs of adjacent ones of the tubing segments for each of the manifold sub-assemblies.

Also, in accordance with another preferred embodiment of the present invention, the arcuate spacer section convex surface is disposed toward the casing when installed, thereby absorbing radiant heat from the casing and the spacer section extends below an axis which is tangent to the first and second ones of the pair of tubing segments in a location proximate the casing. Each of the first and second retainers include an inner radius which is smaller than an outer radius of the corresponding tubing segment, thereby creating an interference fit, a radially extending flange at a distal end of the retainer, and a pre-formed shape established prior to installation. The first retainer contacts the first one of the circumferentially extending tubing segments over an arc ranging from 160° to 200° degrees while the second retainer contacts the second one of the circumferentially extending tubing segments over an arc ranging from 100° to 140° degrees. The clip element may be installed by hand without removing the manifold from the casing, thereby providing an economical means of installation and the clip element comprises a unitary construction, thereby providing an economical means of construction, utilizing a material selected from the group consisting of 321 stainless steel and Inconel X.

In an alternate embodiment in accordance with the present invention, a hand-held tool is used to form the second retainer over the second tubing segment and consequently an interference fit only applies to the first retainer and tubing segment.

BRIEF DESCRIPTION OF THE DRAWINGS

The method steps and apparatus of the present invention, as well as the advantages derived therefrom, will become more apparent from the subsequent detailed description of the preferred embodiments when taken in conjunction with the accompanying drawings in which.

DETAILED DESCRIPTION

Figure 1:
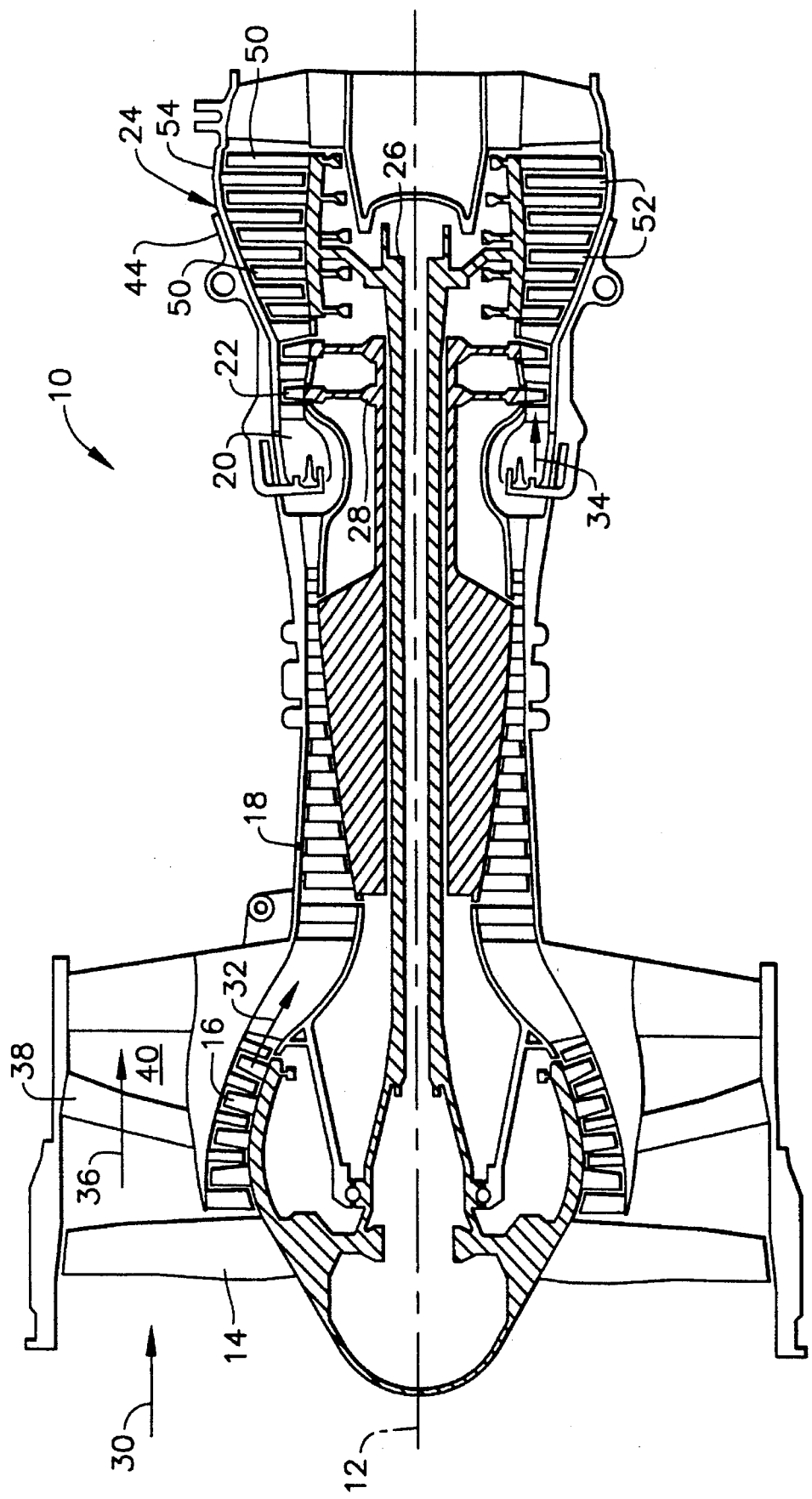
FIG. 1 is a longitudinal cross-sectional view illustrating an exemplary gas turbine engine incorporating the damping apparatus of the present invention.

Referring now to the drawings, wherein like reference numerals have been used for similar elements throughout, FIG. 1 is a longitudinal cross-sectional view illustrating an exemplary gas turbine engine 10, of the high bypass turbofan type, which is effective for powering an aircraft (not shown) in flight. Engine 10 includes the following components in serial, axial flow relationship, with the components disposed symmetrically about longitudinal axis 12: a fan 14; a low pressure compressor, or booster 16; a high pressure compressor 18; a combustor 20; a high pressure turbine 22; and a low pressure turbine 24. Low pressure turbine 24 is drivingly connected to both the fan 14 and the booster 16 by a conventional first rotor shaft 26, and high pressure turbine 22 is drivingly connected to high pressure compressor 18 by conventional second rotor shaft 28.

Ambient air 30 enters engine 10 during operation and a first portion, denoted the primary or core airflow 32, passes through fan 14, booster 16 and compressor 18, being pressurized by each component in succession. Core airflow 32 then enters combustor 20 where it is mixed with fuel and burned to provide a high energy gas stream 34. Gas stream 34 then enters high pressure turbine 22 where it is expanded, with energy extracted to drive high pressure compressor 18. Gas stream 34 then enters low pressure turbine 24 where it is further expanded in order to drive fan 14 and booster 16. A second portion of ambient air 30, denoted the secondary or bypass airflow 36, passes through fan 14 and fan outlet guide vanes 38 located in annular duct 40 before exiting engine 10 through a fan nozzle (not shown), thereby providing a significant portion of the engine thrust.

Engine 10 further includes a system of external piping which includes low pressure turbine cooling manifold 44 which surrounds low pressure turbine 24. Low pressure turbine 24 comprises a rotor assembly which includes multiple rows of radially extending blades 50 and a stator assembly which includes multiple rows of nozzle segments 52 which are positioned axially in alternating relationship with the rotor blades 50. The stator casing also includes an annular casing 54 which surrounds blades 50 and nozzle segments 52. Cooling manifold 44 is disposed in a generally concentric relationship with casing 54 and is attached to casing 54 by conventional brackets (not shown).

Figure 2:
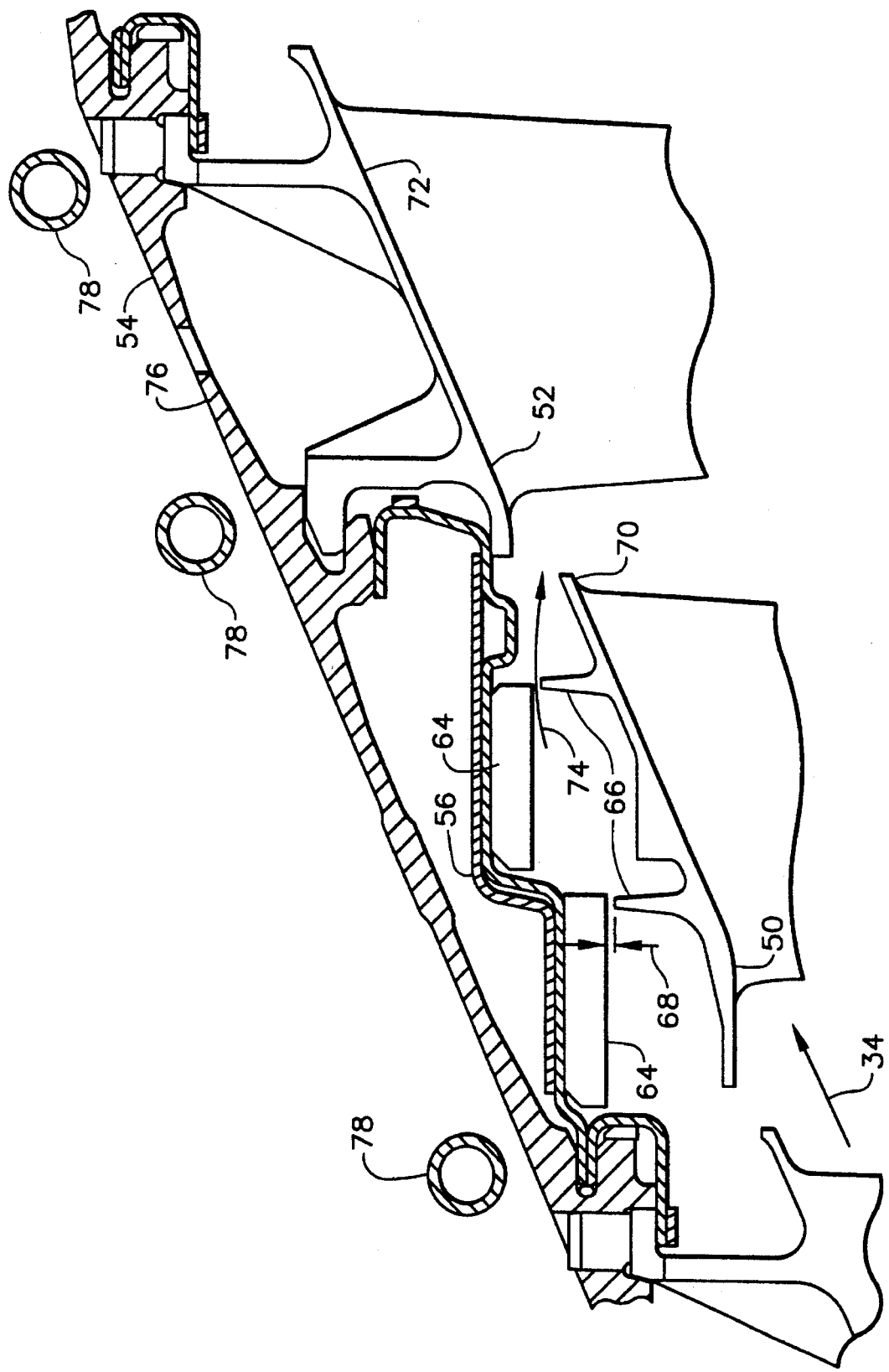
FIG. 2 is an exploded cross-sectional view illustrating a portion of the low pressure turbine depicted in FIG. 1.

As shown in FIG. 2, which is an exploded cross-sectional view illustrating a portion of low pressure turbine 24, the stator assembly of low pressure turbine 24 further includes shroud segments 56 which are positioned radially outward of rotor blades 50. Shroud segments 56 and nozzle segments 52 are attached to annular casing 54 in a conventional manner. Shroud segments 56 include abradable sections 64 which are positioned radially outward of and proximate with tips 66 of blades 50, thereby forming radially extending clearance 68 therebetween. Blades 50 and nozzle segments 52 each include outer platforms having radially inward facing surfaces 70 and 72, respectively, which when taken together, form the outer flowpath boundary for high energy gas stream 34.

During engine operation, the magnitude of radial clearance 68 varies, with leakage air 74 passing through clearance 68. It is desirable to minimize the magnitude of clearance 68, and therefore leakage air 74, during operation of engine 10 since leakage air 74 is not available for energy extraction, as compared to gas stream 34 which passes through blades 50 and nozzles 52. Therefore, leakage air 74 represents a reduction in efficiency of engine 10. Also, during operation of engine 10 an exterior surface 76 of casing 54 can become very hot, with temperatures exceeding 1000° Fahrenheit for a typical takeoff condition with no cooling air applied to casing 54. In order to minimize clearance 68 and leakage flow 74, and to preserve the structural integrity of casing 54, cooling manifold 44 (represented in FIG. 2 by individual tubes 78) is utilized to impinge cooling air, in a manner known in the art on the exterior surface 76 of casing 54. In order to effect optimum results, individual tubes 78 of cooling manifold 44, which are circumferentially extending and spaced apart axially, are positioned over exterior surface 76 of casing 54 at axial locations corresponding to internal flanges of casing 54 which are used to support shroud segments 56 and nozzle segments 52. Cooling air is supplied to manifold 44 by a supply piping system (not shown) in a conventional manner and in a preferred embodiment the manifold cooling air comprises a portion of the bypass airflow 36 which discharges fan 14. The cooling air is distributed to tubing segments 78 as subsequently discussed.

Figure 3:
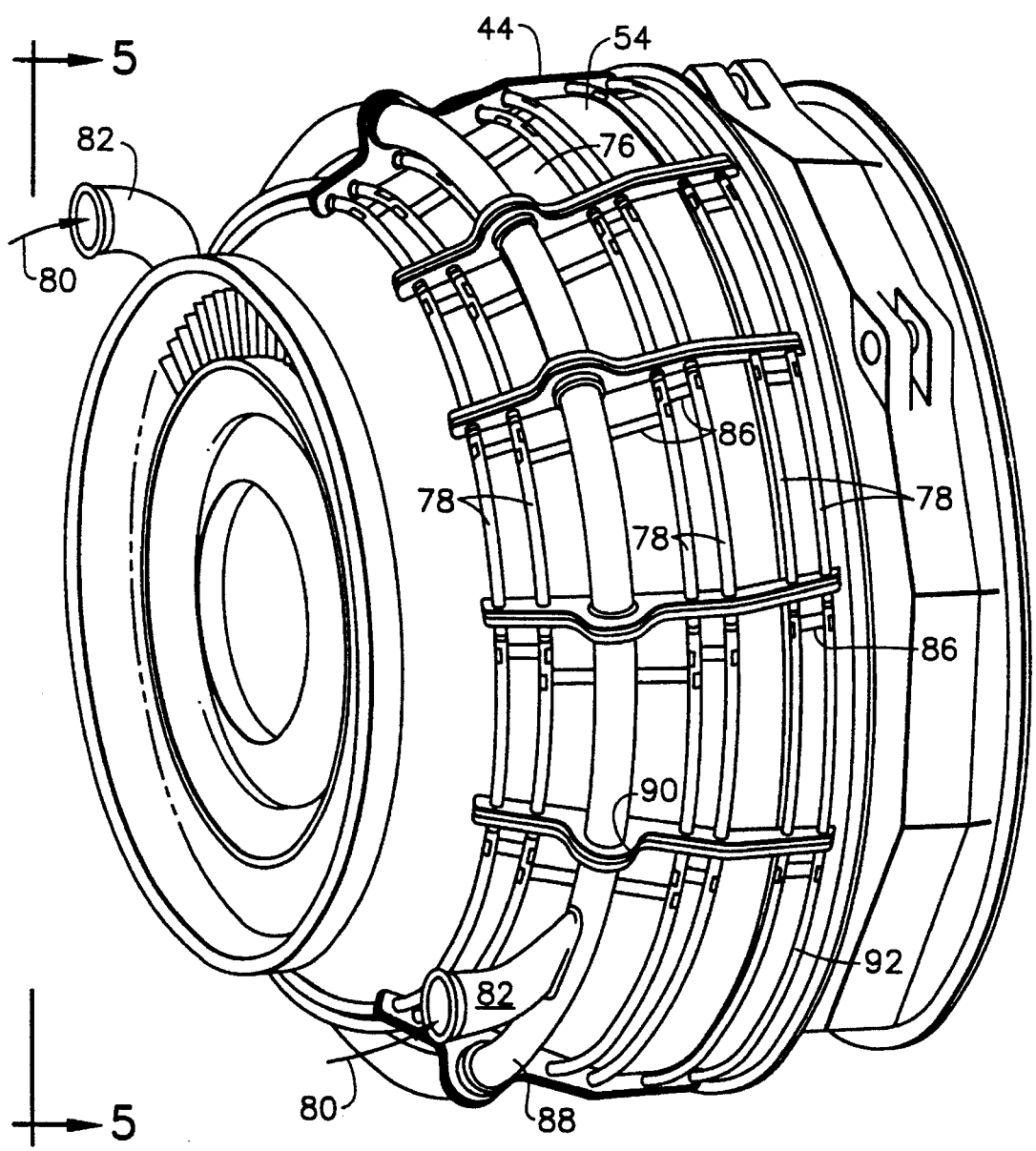
FIG. 3 is an exploded perspective view of the low pressure turbine of FIG. 1, with the vibration damping means of the present invention installed.
Figure 4:
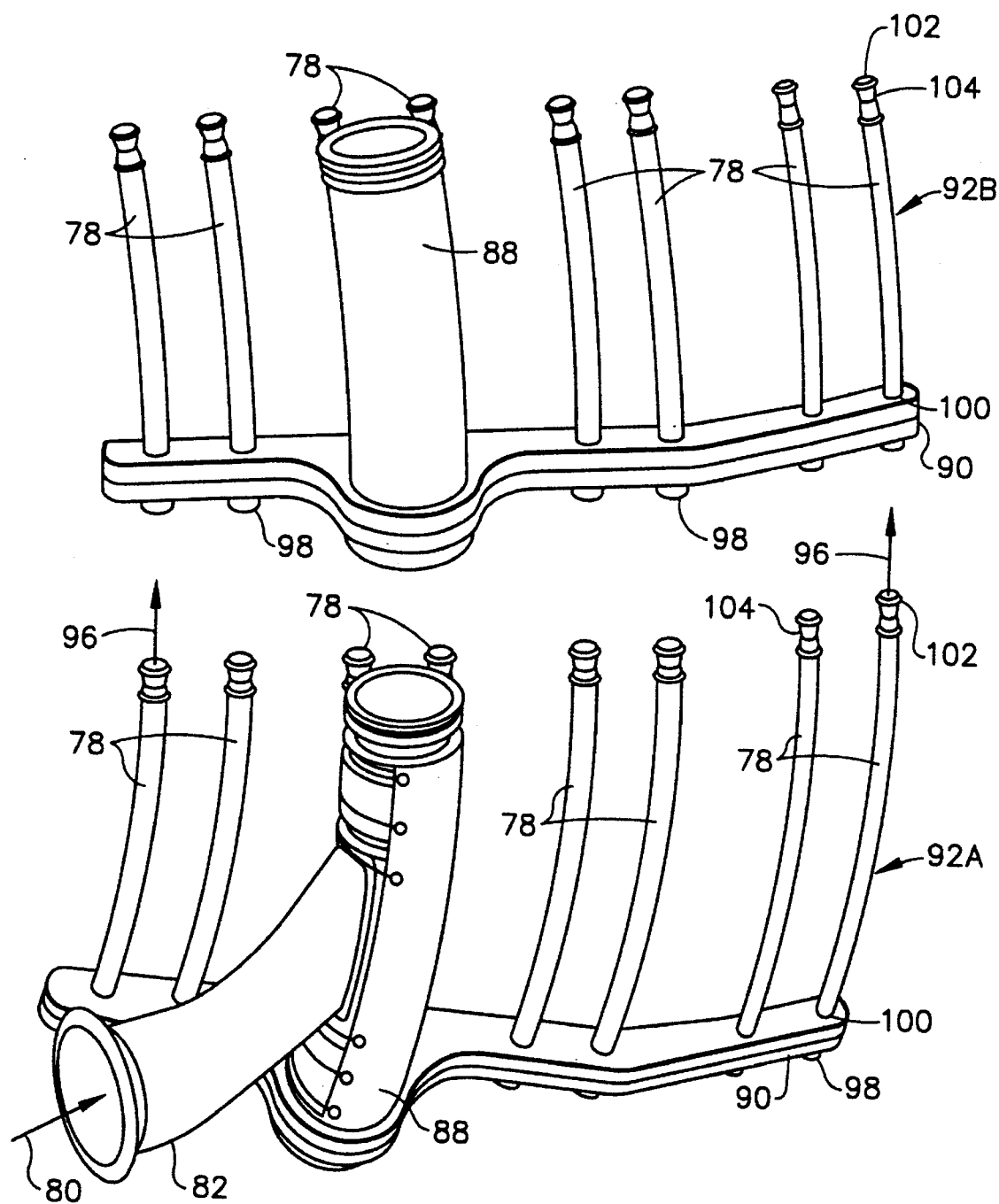
FIG. 4 is an exploded perspective view illustrating two subassemblies of the low pressure turbine cooling manifold of FIG. 3, with the sub-assemblies shown in separated, disassembled fashion to illustrate manifold components and construction.
Figure 5:
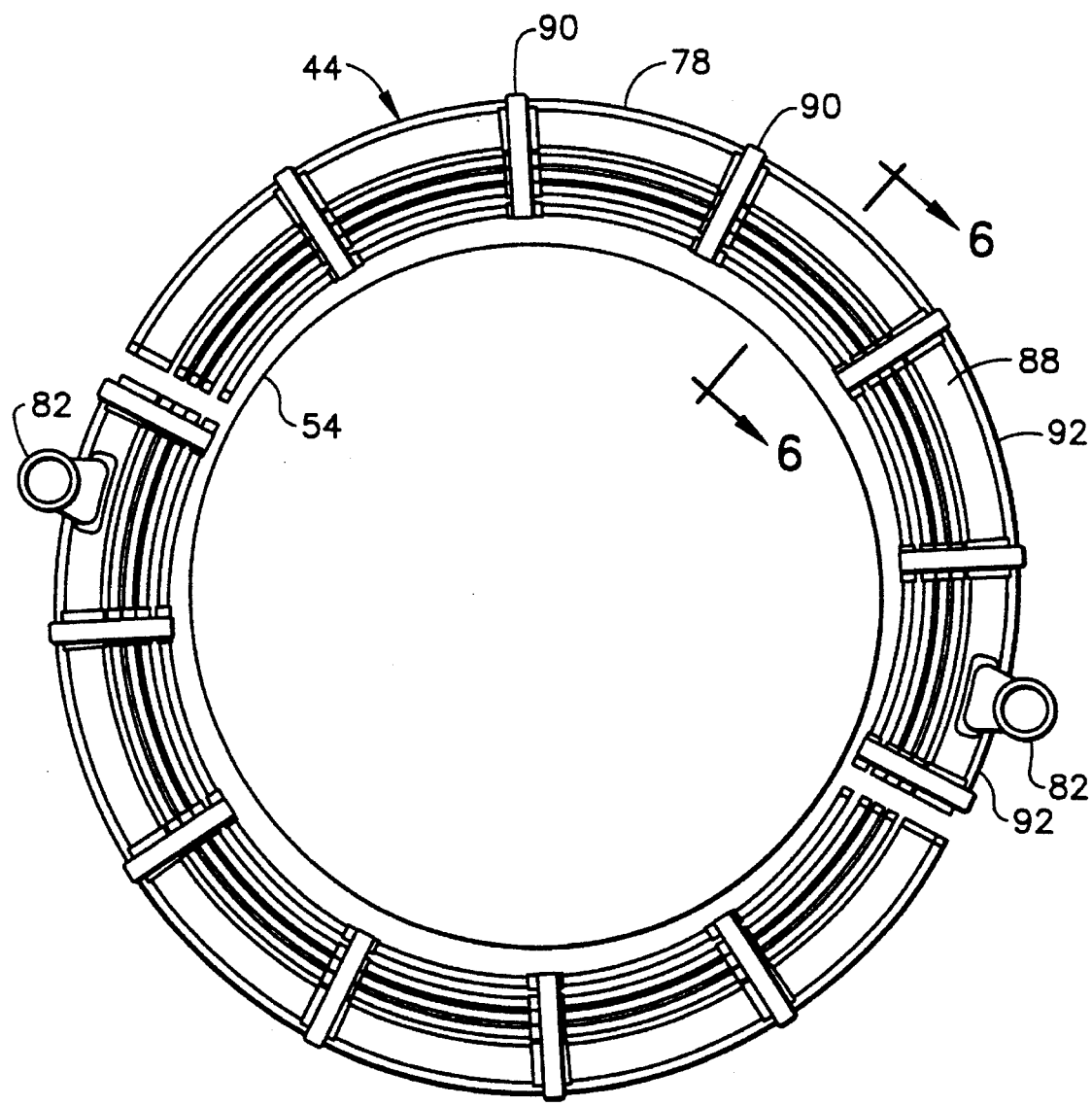
FIG. 5 is a forward looking aft view illustrating the low pressure turbine cooling manifold of FIG. 3 taken along line 5—5 in FIG. 3.
Figure 6:
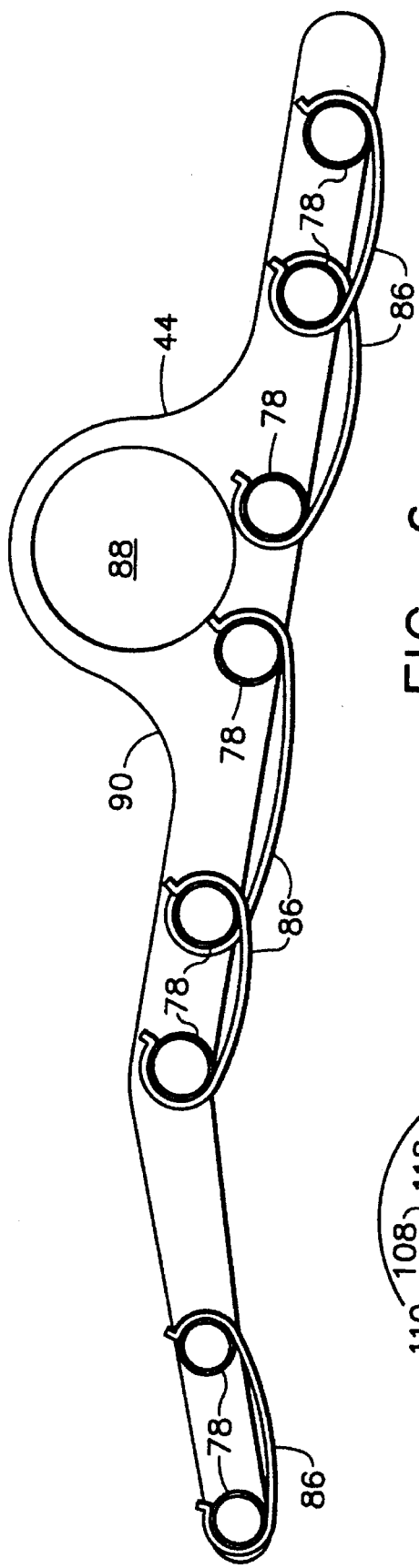
FIG. 6 is a cross-sectional view illustrating the low pressure turbine cooling manifold of FIG. 5 taken along line 6—6 in FIG. 5.

Referring now to FIGS. 3–7, the vibration damping means of the present invention, comprising a plurality of clip elements 86, is illustrated as well as additional structural features of manifold 44. The distribution of cooling air through manifold 44 is best illustrated in FIG. 3 which is an exploded perspective view of low pressure turbine 24. Manifold 44 includes a pair of air inlets 82, which receive cooling air 80, comprising a portion of bypass airflow 36 in a preferred embodiment. Inlets 82 are attached to a relatively large diameter, circumferentially extending manifold distribution tube 88 which is utilized to deliver cooling air 80 to a plurality of axially extending plenums 90 which in turn deliver cooling air 80 to the plurality of circumferentially extending and axially spaced apart cooling tubing segments 78. Manifold 44 comprises a plurality of axially and circumferentially extending sub-assemblies 92 which are interconnected to one another, with each sub-assembly containing one of the axially extending plenums 90, a plurality of tubing segments 78, and a circumferential segment of distribution tube 88. Two of the manifold sub-assemblies 92, depicted as sub-assemblies 92A and 92B are illustrated in the exploded perspective view of FIG. 4, wherein clip elements 86 have been removed for clarity. Sub-assemblies 92A and 92B are shown in disassembled, separated fashion, with arrows 96 illustrating mating elements of sub-assemblies 92A and 92B, in order to further illustrate the nature of the construction of manifold 44. Each plenum 90 includes a plurality of female sleeves or connectors 98 fixedly attached to plenum 90 as best seen on sub-assembly 92B. Each tubing segment 78 includes a first end 100 which is fixedly attached, such as by brazing in a preferred embodiment, to plenum 90 and a second end 102 which terminates in a male connector 104. Each male connector 104 engages a corresponding and aligned one of the female sleeves 98, thereby creating a slip joint at one end of each tube 78. Due to the braze joint at one end and the slip joint at the other end, tubing segments 78 may be considered to be generally cantilevered and therefore the vibration of tubing segments 78 approximate the vibration characteristics of a cantilevered beam or that of the forks of a tuning fork. Accordingly, during engine operation, the second end 102 of each tubing segment 78 vibrates within the constraints imposed by the diametral fit of male connector 104 within female sleeve 98, wherein a relatively small annular clearance is provided between male connector 104 and sleeve 98 for purposes of assembly. The annular clearance between connector 104 and sleeve 98 is sized so as to discourage any leakage of cooling air 80. Over a period of time the vibration of tubing segments 78 can cause wear to occur around the outer periphery of male connectors 104 and around the inner surface of sleeves 98 which can lead to leakage of cooling air 80, which in turn can have adverse effects on the structural integrity of casing 54 and can also cause undesirable increases in radial clearance 68, thereby decreasing the operational efficiency of engine 10. FIG. 5 further illustrates the relationship between manifold 44 and casing 54, wherein manifold 44 is disposed in a generally concentric relationship with casing 54 and attached to casing 54 by conventional brackets (not shown), wherein clip elements 86 have been removed from FIG. 5 for clarity. As shown in FIGS. 3 and 6, each clip element 86 is attached to an axially adjacent pair of tubing segments 78 and, as best seen in FIG. 3, each clip element 86 is positioned on the pair of tubing segments 78 proximate a corresponding pair of the slip joints created by the engagement of male connectors 104 on tubing segments 78 with female sleeves 98 on plenums 90.

As best seen figure in 7, which is an exploded view of a portion of manifold 44 and a single clip element 86 shown in FIG. 6, each clip element 86 comprises an arcuate first retainer 108 which contacts a first one of a pair of tubing segments 78 over an arc 110 which preferably ranges from 160° to 200° degrees and most preferably is approximately 180° degrees. Each clip element 86 further comprises an arcuate second retainer 112 which contacts the second one of the pair of tubing segments 78 over an arc 114 which preferably ranges from 100° to 140° degrees and is most preferably approximately 120° degrees, and a spacer section 116 which is connected to the first and second retainers, 108 and 112, respectively, thereby establishing the required axial spacing between retainers 108 and 112. Arc 114 is smaller than arc 110 in order to facilitate installation of clip elements 86 by hand, without the use of tools, but is large enough to ensure adequate retention of retainer 112 over the second one of tubing segments 78. Retainers 108 and 112 each include a radially extending flange 118 which is connected to retainers 108 and 112 at a distal end 109 of retainer 108 and a distal end 111 of retainer 112, respectively. Distal ends 109 and 111 may be considered to be the free ends of retainers 108 and 112, respectively. Flanges 118 may be used to facilitate installation and removal of clip elements 86.

Retainer 108 is pre-formed prior to installation such that such that inside radius 122 of retainer 108 is slightly smaller than an outside radius 124 of the correspondence tubing segment 78, thereby creating a slight interference fit between retainer 108 and the corresponding tubing segment 78. In a similar fashion, retainer 112 is pre-formed prior to installation so that inside radius 126 is slightly smaller than outside radius 128 of the corresponding one of tubing segments 78, thereby creating an interference fit between retainer 112 and the corresponding tubing segment 78. Spacer 116 is arcuately shaped with concave surface 130 formed by radius 132 and with the extent of curvature also characterized by drop dimension 134 which extends between a line tangent to each of the pair of tubing segments 78 and a parallel line which is tangent to convex surface 136. Additionally, spacer 116 is sized so that the axial separation between retainers 108 and 112 in a free state condition (i.e., prior to installation) is slightly less than axial distance 138 extending between the first and second ones of the pair of tubing segments 78, thereby increasing the interference fit between retainers 108 and 112 and the corresponding tubing segments 78. Clip elements 86 are installed with convex surface 136 disposed towards casing exterior surface 76 as best seen in FIGS. 3 and 6. Retainers 108 and 112, including flanges 118 and spacer 116, are formed of a single piece of sheet metal which is preferably made of either 321 stainless steel or Inconel X. The values of inner radii 122 and 126 of retainers 108 and 112, respectively, as well as the size of spacer radius 132 and drop dimension 134 are selected based on considerations of specific applications including the diameters of tubing segments 78, the axial spacing between axially adjacent ones of tubing segments 78, and the thermal environment surrounding tubing segments 78 to yield desired vibration damping characteristics of tubing segments 78.

Figure 7:
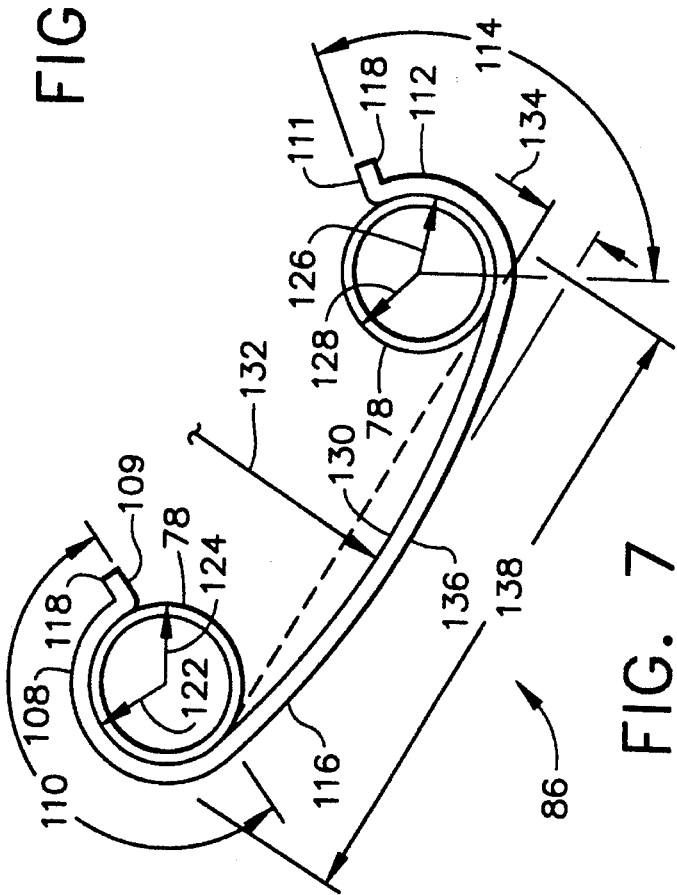
FIG. 7 is an exploded view illustrating a portion of the cooling manifold of FIG. 6 and further illustrating the vibration damping means of FIG. 6.
Figure 8A:
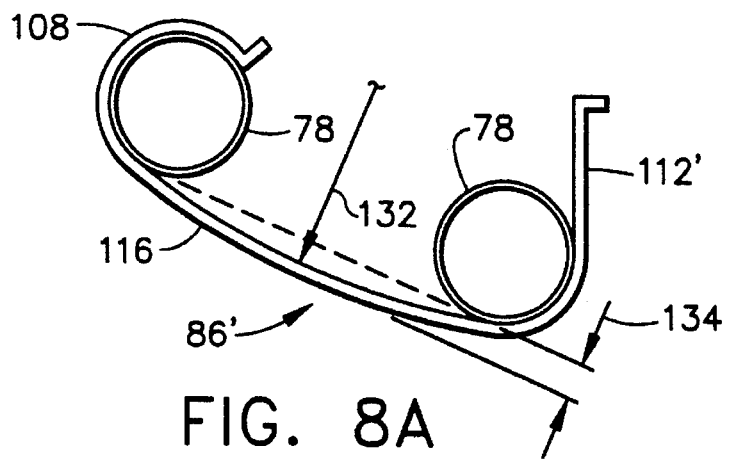
FIGS. 8 A, B, C and D are exploded views illustrating an installation sequence of the vibration damping means of the present invention according to an alternate embodiment.
Figure 8B:
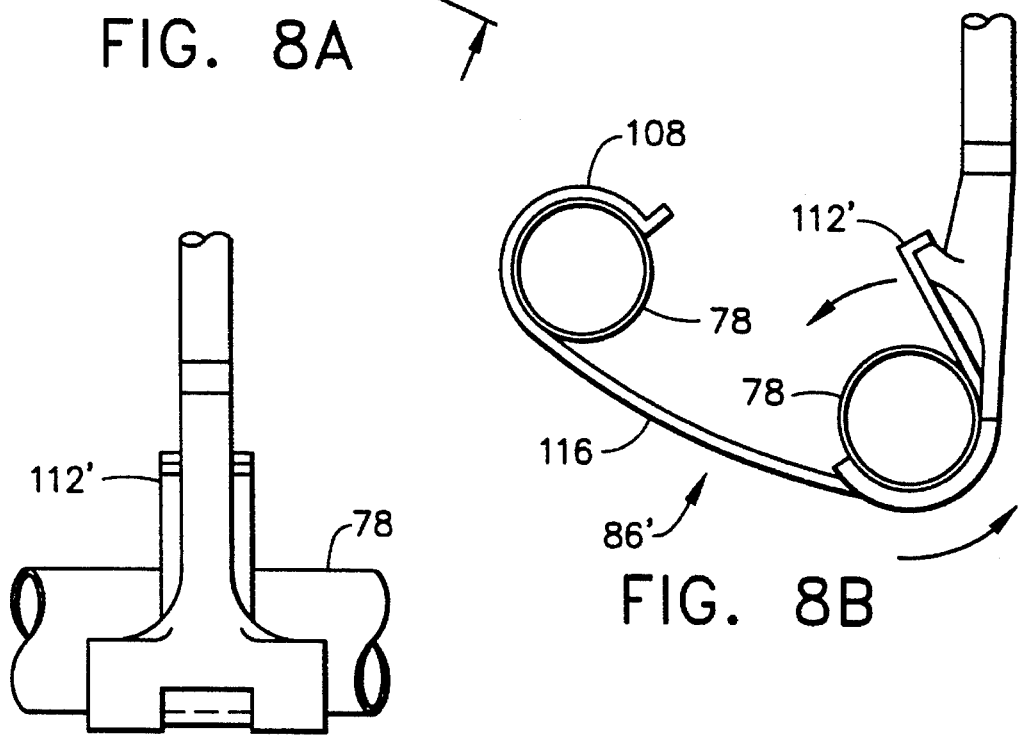
Figure 8C:
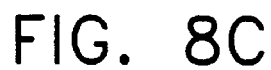
Figure 8D:
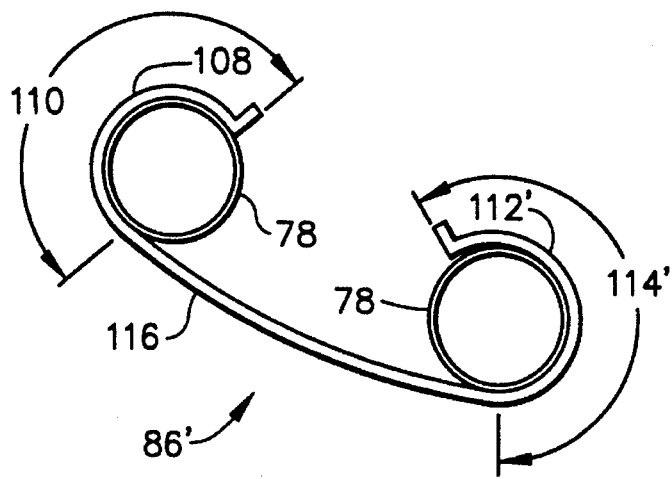

FIGS. 8A, 8B, 8C and 8D illustrate an alternate embodiment of the present invention comprising a plurality of clip elements 86' which are the same as clip elements 86 depicted in FIGS. 3, 6 and 7, except that retainer 112 is not preformed with a final radius of curvature unlike retainer 112 of clip element 86 but is initially shaped as illustrated in FIG. 8A. A hand-held tool is then used to form retainer 112' around the second one of the pair of tubing segments 78 as shown in FIGS. 8B and 8C. Due to this procedure an interference fit does not exist between retainer 112' and the corresponding one of tubing segments 78. Accordingly, retainer 112' is formed so as to partially encircle the corresponding tubing segment 78 over an arc 114' having a value of at least 180° to ensure proper retention of retainer 112' as shown in FIG. 8D. The maximum value of arc 114' determined by the envelopes of the hand-held tool and manifold 44. The construction of the embodiment of clip elements 86' illustrated in FIGS. 8A, B, C and D is otherwise the same as that for clip elements 86 illustrated in FIGS. 3, 6 and 7.

The present invention provides a method of damping the vibrations of the circumferentially extending and generally cantilevered tubing segments 78 of manifold 44 of engine 10, wherein the method comprises the steps of: maintaining manifold 44 in a generally concentric relationship with casing 54; attaching a clip element 86 to an adjacent pair of tubing segments 78; and positioning the clip element 86 on the pair of tubing segments 78 proximate a pair of slip joints. The step of positioning the clip element 86 comprises the step of disposing convex surface 136 of clip element 86 toward casing 54. The step of attaching clip element 86 comprises the step of snapping the first and second retainers 108 and 112, respectively, of clip element 86 onto the pair of tubing segments 78 in a preferred embodiment. With respect to the alternate embodiment illustrated in FIGS. 8A, B and C, the step of attaching comprises the steps of: snapping first retainer 108 of clip element 86' onto a first one of the pair of tubing segments 78; and forming second retainer 112' of clip element 86' partially around a second one of the pair of tubing segments 78. The previously described method steps of the present invention, with respect to either of the embodiments discussed, are repeated with respect to the remaining pairs of adjacent ones of tubing segments 78 for each of the sub-assemblies 92 of manifold 44.

In operation, clip elements 86 or 86' damps the vibrations of the circumferentially extending and generally cantilevered tubing segments 78 of manifold 44 and therefore reduce vibration induced wear occurring around the exterior of male connectors 104 of tubing segments 78 and around the interior of female sleeves 98 of plenum 90. As noted previously, tubing segments 78 approximate the vibration characteristics of cantilevered beams with the tubes being cantilevered from brazed end 100 with free end 102 exhibiting the maximum vibration displacement. Therefore, to provide effective damping it is critical that clip elements 86 or 86' are positioned circumferentially adjacent the free ends 102 of tubes 78 which form slip joints with plenums 90 via the interfaces between male connectors 104 and female sleeves 98. The natural frequency of tubing segments 78 may be approximated by:

$$\omega = \sqrt{\frac{k}{ml^3}}$$

where:

ω=natural frequency k=spring constant which accounts for geometric characteristics and material proprieties of the tubing segment m=tubing segment mass l=tubing segment length from brazed end 100 to free end 102

The operating principle of clip elements 86 and 86' is to increase the natural frequency of each of the affected tubing segments 78 to a value exceeding the frequency of the principle (one/rev) vibrations of engine 10 corresponding to maximum rotor speeds which are transmitted to casing 54 and tubing segments 78 due to the mounting of manifold 44 on casing 54. This increase in natural frequency of tubing segments 78 is accomplished primarily by a change in spring constant of each of the affected tubing segments 78, due to the interference fit and/or the extent of contact between retainers 108 and 112 (or 112') and the corresponding ones of the pair of axially adjacent tubing segments 78. The change in effective length of tubing segments 78 is small due to the circumferential position of clip elements 86 or 86' adjacent free ends 102 and the associated slip joints, which differs from prior art damping devices which typically are used to clamp tubing runs to fixed structures at specified intervals to reduce the effective length of the corresponding tubes. The arcuate shape of retainer 116, with convex surface 136 disposed towards casing 54, also enhances the damping characteristics of clip elements 86 and 86' by absorbing radiant heat from casing exterior surface 76, thereby causing a flexing of spacer 116 rather than tubing segments 78. It is also important to note that clip elements 86 and 86' permit thermal expansion of tubing segments 78, thereby avoiding thermally induced stresses which would be caused if tubing segments 78 were fixedly attached to adjacent support structures, in the manner of prior damping devices.

In conclusion, clip elements 86 and 86' comprise an effective means for reducing vibration induced wear on the exterior of male connectors 104 of tubing segments 78 and around the interior of female sleeves 98 of plenums 90, wherein clip elements 86 and 86' are inexpensive to manufacture and can be installed, in very little time, by hand or with the aid of a hand-held tool. The installation of clip elements 86 and 86' may be accomplished without removing manifold 44 from engine 10 and furthermore may be accomplished with engine 10 installed on an aircraft, thereby increasing the installed life span of manifold 44 and significantly reducing operational costs of engine 10.

While the foregoing description has set forth the preferred embodiments of the present invention in particular detail, it must be understood that numerous modifications, substitutions and changes can be undertaken without departing from the true spirit and scope of the present invention as defined by the ensuing claims. The protection desired to be secured by Letters Patent of the United States for this invention is defined by the subject matter of the following claims.

What is claimed is:

1. A method of damping the vibrations of circumferentially extending and generally cantilevered tubing segments of a gas turbine engine cooling manifold, said manifold being disposed in a generally concentric relationship with and attached to an annular engine casing, said manifold comprising a plurality of subassemblies, said sub-assemblies being connected to one another with each of said sub-assemblies including an axially extending plenum having a plurality of female sleeves integral with a first side of said plenum and a plurality of said circumferentially extending and generally cantilevered tubing segments which are spaced apart axially, each of said tubing segments having a first end fixedly attached to a second side of said plenum and a second end terminating in a male connector, each of said male connectors of said tubing segments of a first one of said subassemblies engaging an aligned one of said female sleeves of a circumferentially adjacent one of said manifold sub-assemblies in a slip joint connection, said method comprising the steps of:

a) maintaining said manifold in a generally concentric relationship with said casing;

b) attaching a clip element to an adjacent pair of said tubing segments; and c) positioning said clip element on said pair of tubing segments proximate a corresponding pair of said slip joints.

2. A method as recited in claim 1, wherein the step of positioning comprises the step of disposing a convex surface of said clip element toward said annular casing.

3. A method as recited in claim 2, wherein the step of attaching comprises the step of snapping first and second retainers of said clip element onto said pair of tubing segments.

4. A method as recited in claim 2, wherein the step of attaching comprises the steps of:

a) snapping a first retainer of said clip element onto a first tubing segment of said pair of tubing segments;

b) forming a second retainer of said clip element partially around a second tubing segment of said pair of tubing segments.

5. A method as recited in claim 1 further comprising the steps of:

attaching a clip element to each of the remaining pairs of adjacent ones of said tubing segments; and positioning each of said clip elements proximate a corresponding pair of said slip joints.

6. In a gas turbine engine which includes an annular casing and a cooling manifold disposed in a generally concentric relationship with and attached to said casing, said manifold including a plurality of sub-assemblies which are interconnected to one another, each of said sub-assemblies including an axially extending plenum having a plurality of female sleeves integral with a first side of said plenum and a plurality of circumferentially extending and generally cantilevered tubing segments which are spaced apart axially, each of said tubing segments having a first end fixedly attached to a second side of said plenum and a second end terminating in a male connector, each of said male connectors of said tubing segment of a first one of said manifold sub-assemblies engaging an aligned one of said female sleeves of an adjacent one of said manifold sub-assemblies in a slip joint connection, an improvement to said cooling manifold, comprising:

a) means for damping vibrations of said tubing segments thereby reducing vibration induced wear between corresponding ones of said female sleeves and said male connectors;

b) said damping means comprising a clip element attached to a pair of tubing segments of a first one of said sub-assemblies of said manifold and positioned circumferentially adjacent to a corresponding pair of said slip joints;

c) said clip element comprising:

i) an arcuate first retainer which retains a first one of said pair of tubing segments,
   ii) an arcuate second retainer which retains a second one of said pair of tubing segments, and
   iii) an arcuate spacer section having a concave surface and a convex surface, said spacer section being positioned between said first and said second retainers, thereby maintaining a proper spatial relationship between said first and said second retainers; and
d) wherein said clip element increases a spring constant of each of said first and said second ones of said pair of tubing segments;
e) wherein said clip element accommodates thermal expansion of each of said first and said second ones of said pair of tubing segments.

7. The improvement according to claim 6, wherein:
a) said convex surface of said arcuate spacer section is disposed toward said casing when installed, thereby absorbing radiant heat from said casing; and
b) said arcuate spacer section extends below an axis which is tangent to said first and said second ones of said pair of tubing segments at a location proximate said casing.

8. The improvement according to claim 7, wherein:
a) each of said first and said second retainers include
   i) an inner radius which is smaller than an outer radius of the corresponding one of said tubing segments, thereby creating interference fits between said first and second retainers and corresponding ones of said pair of tubing segments,
   ii) a radially extending flange at a distal end thereof, and
   iii) a pre-formed shape established prior to installation;
b) said first retainer contacts said first one of said pair of tubing segments over an arc ranging from 160° to 200°;
c) said second retainer contacts said second one of said pair of tubing segments over an arc ranging from 100° to 140°; and
d) wherein said clip element may be installed by hand without removing said manifold from said casing, thereby providing an economical means of installation.

9. The improvement according to claim 8, wherein said clip element comprises a unitary construction, thereby providing an economical means of construction, utilizing a material selected from the group consisting of 321 stainless steel and Inconel X.

10. The improvement according to claim 7, wherein:
a) each of said first and said second retainers include a radially extending flange at a distal end thereof;
b) said first retainer
   i) includes an inner radius which is smaller than an outer radius of said first one of said pair of tubing segments, thereby creating an interference fit between said first retainer and said first one of said pair of tubing segments,
   ii) includes a pre-formed shape established prior to installation,
   iii) contacts said first one of said pair of tubing segments over an arc ranging from 160° to 200°;
c) said second retainer includes a shape formed by a hand-held tool during installation and partially encircles said second one of said pair of tubing segments over an arc of at least 180°; and
d) wherein said clip element may be installed without removing said manifold from said casing, requiring only the assistance of said hand-held tool, thereby providing an economical means of installation.

11. The improvement according to claim 10, wherein said clip element comprises a unitary construction, thereby providing an economical means of construction, utilizing a material selected from the group consisting of 321 stainless steel and Inconel X.

* * * * *